(12) United States Patent
Lucas et al.

(10) Patent No.: US 7,950,370 B2
(45) Date of Patent: May 31, 2011

(54) HIGH PRESSURE COMMON RAIL FUEL SYSTEM WITH GAS INJECTION

(75) Inventors: Michael A. Lucas, Morgantown, IN (US); Lars Tegnelius, Columbus, IN (US); Donald J. Benson, Columbus, IN (US)

(73) Assignee: Cummins Inc., Columbus, IN (US)

( * ) Notice: Subject to any disclaimer, the term of this patent is extended or adjusted under 35 U.S.C. 154(b) by 35 days.

(21) Appl. No.: 12/047,434

(22) Filed: Mar. 13, 2008

(65) Prior Publication Data

US 2009/0229572 A1  Sep. 17, 2009

(51) Int. Cl.
*F02M 69/46* (2006.01)

(52) U.S. Cl. ........................................ 123/435; 123/526

(58) Field of Classification Search .............. 123/446, 123/447, 456, 457, 496, 531, 27 GE, 525, 123/526; 701/104
See application file for complete search history.

(56) References Cited

U.S. PATENT DOCUMENTS

| | | | |
|---|---|---|---|
| 3,708,979 A * | 1/1973 | Bush et al. ........... 60/522 |
| 3,946,562 A | 3/1976 | Ross | |
| 4,193,818 A | 3/1980 | Young et al. | |
| 4,381,077 A | 4/1983 | Tsumura et al. | |
| 4,404,639 A | 9/1983 | McGuire et al. | |
| 4,476,827 A * | 10/1984 | Basaglia et al. ........... 123/276 |
| 4,503,814 A | 3/1985 | Fujihara et al. | |
| 4,577,237 A | 3/1986 | Collins | |
| 4,643,642 A | 2/1987 | May | |
| 4,673,335 A | 6/1987 | Nicodemus | |
| 4,787,350 A * | 11/1988 | Syassen ........... 123/300 |
| 4,802,872 A | 2/1989 | Stanton | |
| 4,823,756 A | 4/1989 | Ziejewski et al. | |
| 4,899,714 A | 2/1990 | Schechter et al. | |
| 4,932,374 A | 6/1990 | Klomp et al. | |
| 4,987,878 A | 1/1991 | Johnson | |
| 5,046,472 A | 9/1991 | Linder | |
| 5,048,497 A | 9/1991 | Kishida et al. | |
| 5,170,727 A | 12/1992 | Nielsen | |
| 5,172,865 A | 12/1992 | Takano et al. | |
| 5,344,288 A | 9/1994 | Oda | |
| 5,884,611 A | 3/1999 | Tarr et al. | |
| 6,000,380 A * | 12/1999 | Weisbarth ........... 123/456 |

(Continued)

FOREIGN PATENT DOCUMENTS

| | | |
|---|---|---|
| EP | 0 761 961 A1 | 3/1997 |
| JP | 2003-120443 A | 4/2003 |
| JP | 2003-227416 A | 8/2003 |
| JP | 2005-090392 A | 4/2005 |

OTHER PUBLICATIONS

The International Search Report with mailing date of Aug. 24, 2009; International Application No. PCT/US2009/036883.

(Continued)

*Primary Examiner* — Willis R Wolfe, Jr.
*Assistant Examiner* — Johnny H Hoang
(74) *Attorney, Agent, or Firm* — Studebaker & Brackett PC; Tim L. Brackett, Jr.; J. Bruce Schelkopf

(57) ABSTRACT

A high pressure common rail fuel system is provided including a fuel supply, a high pressure pump assembly fluidly connected to receive fuel from the fuel supply, and a gas supply system fluidly connected to provide gas to the high pressure pump assembly to create a high pressure gas fuel mixture. A common rail fuel system is fluidly connected to the high pressure pump assembly to receive the high pressure gas fuel mixture.

23 Claims, 3 Drawing Sheets

U.S. PATENT DOCUMENTS

| | | | |
|---|---|---|---|
| 6,003,478 A * | 12/1999 | Huber | 123/27 GE |
| 6,145,496 A | 11/2000 | Pace et al. | |
| 6,234,148 B1 * | 5/2001 | Hartke et al. | 123/447 |
| 6,241,802 B1 | 6/2001 | Spears et al. | |
| 6,250,260 B1 * | 6/2001 | Green | 123/27 GE |
| 6,315,942 B1 | 11/2001 | Spears et al. | |
| 6,457,309 B1 * | 10/2002 | Firey | 60/517 |
| 6,461,590 B2 | 10/2002 | Spears | |
| 6,530,363 B1 * | 3/2003 | Blass et al. | 123/446 |
| 6,647,968 B1 | 11/2003 | Hankins et al. | |
| 6,719,224 B2 | 4/2004 | Enomoto et al. | |
| 6,729,310 B2 | 5/2004 | Ekstam | |
| 6,913,040 B2 | 7/2005 | Crossman et al. | |
| 7,281,500 B1 * | 10/2007 | Firey et al. | 123/23 |
| 7,387,109 B2 * | 6/2008 | Rembold et al. | 123/446 |
| 7,406,955 B1 * | 8/2008 | Gachik et al. | 123/522 |
| 7,438,052 B2 * | 10/2008 | Awano et al. | 123/456 |
| 2004/0111210 A1 * | 6/2004 | Davis et al. | 701/103 |
| 2005/0247048 A1 * | 11/2005 | Schaller et al. | 60/286 |
| 2006/0272620 A1 * | 12/2006 | Gurin | 123/531 |

OTHER PUBLICATIONS

Written Opinion of the International Searching Authority with mailing date of Aug. 24, 2009; International Application No. PCT/US2009/036883.

"Effect of Air Injection on the Cloud Cavitation of a Hydrofoil" written by G. E. Reisman, M. E. Duttweiler, and C. E. Brennen; 1997 ASME Fluids Engineering Division Summer Meeting, Jun. 22-26, 1997.

"Cavitation and Bubble Dynamics" written by Christopher E. Brennen; ISBN 0-19-509409-3; Oxford University Press 1995; Chapter 2.1-2.3 http://caltechbook.library.caltech.edu/1/5/BUBBOOK.pdf.

"Preliminary investigation of the use of air injection to mitigate cavitation erosion" written by Arndt R. E. A., Ellis C. R., Paul S.; in "Journal of fluids engineering".

"Reduction of Pressure Fluctuations Induced by Cavitating Propellers due to Air Injection through the Hall at the Stern of a Ship" written by Yoshitaka Ukon, Junichi Fujisawa, Tatsuro Kudo; in Journal 'Transactions of the West-Japan Society of Naval Architects', vol. No. 99; p. 33-42.

"On Reduction of Cavitation Noise and Pressure Fluctuation Induced by a Cavitating Propeller Due To Air Injection" written by Y. Ukon, Y. Kurobe; in Journal of the Society of Naval Architects of Japan, vol. 163, Issue No. 6.

"Hydraulics of Pipelines: Pumps, Valves, Cavitation, Transients" written by J. Paul Tullis; published from John Wiley & Sons, Inc. on Feb. 1989; ISBN-13: 9780471832850; Edition No. 1; pp. 125-126; Chapter 5.5 http://books.google.com/books?id=86P9PVgKXoEC&pg=PA125&lpg=PA125&dq=air+injection+cavitation&source=bl&ots=-.

* cited by examiner

HIGH PRESSURE COMMON RAIL FUEL SYSTEM WITH GAS INJECTION

TECHNICAL FIELD

The invention relates generally to an improved high pressure common rail fuel system and, more particularly, to a fuel system for controlling cavitation and improving dispersion of fuel.

BACKGROUND OF THE INVENTION

With the advent of increased fuel economy and reduced emissions requirements imposed by the government, various fuel systems have been developed to precisely control the amount of fuel that is injected during the injection events of a combustion cycle. In particular, high pressure fuel injection systems have been developed which provide increased control of the fuel injected by the fuel injectors of an internal combustion engine in comparison to conventional fuel injection systems.

Such high pressure fuel injection systems typically utilize at least one high pressure pump that pressurizes the fuel to be injected by the fuel injectors. Fuel systems may utilize a plurality of such pressure pumps corresponding to the number of fuel injectors, each of the pumps providing highly pressurized fuel to a fuel injector. Other fuel systems utilize fewer high pressure pumps in conjunction with a high pressure common rail. In such implementations, one or more high pressure pumps are connected to the high pressure common rail to thereby provide highly pressurized fuel to the common rail. The common rail then distributes the pressurized fuel to each of the fuel injectors.

U.S. Pat. No. 6,647,968 issued to Hankins et al. discloses an injection system including a fuel rail. A fuel supply is delivered to the fuel rail by a fuel pump. The fuel is further dispersed via a plurality of fuel injectors coupled to the fuel rail. However, the injection system of Hankins et al. may generate undesirable effects within the fuel line or fuel system components as a result of fuel displacement within the injection system. Such effects may occur as fuel flows throughout the fuel injection system, for example, as a result of being induced by a fuel pump. One undesirable effect may include the production of cavitation, i.e., the formation of microscopic bubbles dispersed throughout the fuel within the fuel injection system. Collapse of the cavitation bubbles focuses liquid energy to very small volumes. As a result, spots of high temperature are created and shock waves are emitted against surfaces in close proximity. The effects of cavitation can cause damage or failure to components within the fuel injection system and reduce the service life of fuel injection equipment. These components may include, for example, valves and valve seats, fuel lines, and seals. Additionally, damage due to cavitation may alter the flow characteristics of control orifices within the fueling system and even the injector nozzle orifices which may result in altering the fuel mixture and/or emissions characteristics of the fuel system over time.

The present disclosure is directed towards overcoming one or more shortcomings set forth above.

SUMMARY OF THE INVENTION

It is, therefore, one object of the present invention to overcome the deficiencies of the prior art and to provide a high pressure common rail fuel system including a fuel supply, a high pressure pump assembly fluidly connected to receive fuel from the fuel supply, and a gas supply system fluidly connected to provide gas to the high pressure pump assembly to create a high pressure gas fuel mixture. A common rail fuel system is fluidly connected to the high pressure pump assembly to receive the high pressure gas fuel mixture.

In accordance with another disclosed exemplary embodiment, a method of reducing cavitation in a high pressure common rail fuel system may include providing a fuel supply to a high pressure pump assembly, delivering a gas supply to the high pressure pump assembly, and mixing fuel and gas to form a gas fuel mixture. The mixture may be pressurized at a first pressure and the pressurized gas fuel mixture may be supplied to a common rail fuel system. The method may also include atomizing the gas fuel mixture at a second pressure below said first pressure.

In accordance with yet another disclosed exemplary embodiment, a system for reducing cavitation in a high pressure common rail fuel may include a means for providing a fuel supply to a high pressure pump assembly, a means for delivering a gas supply to the high pressure pump assembly, and a means for mixing fuel and gas to form a gas fuel mixture. The system may also include a means for pressurizing the gas fuel mixture at a first pressure and a means for supplying the pressurized gas fuel mixture to a common rail fuel system. The system may also provide a means for atomizing the pressurized gas fuel mixture at a second pressure below the first pressure.

DETAILED DESCRIPTION OF THE INVENTION

Figure 1:
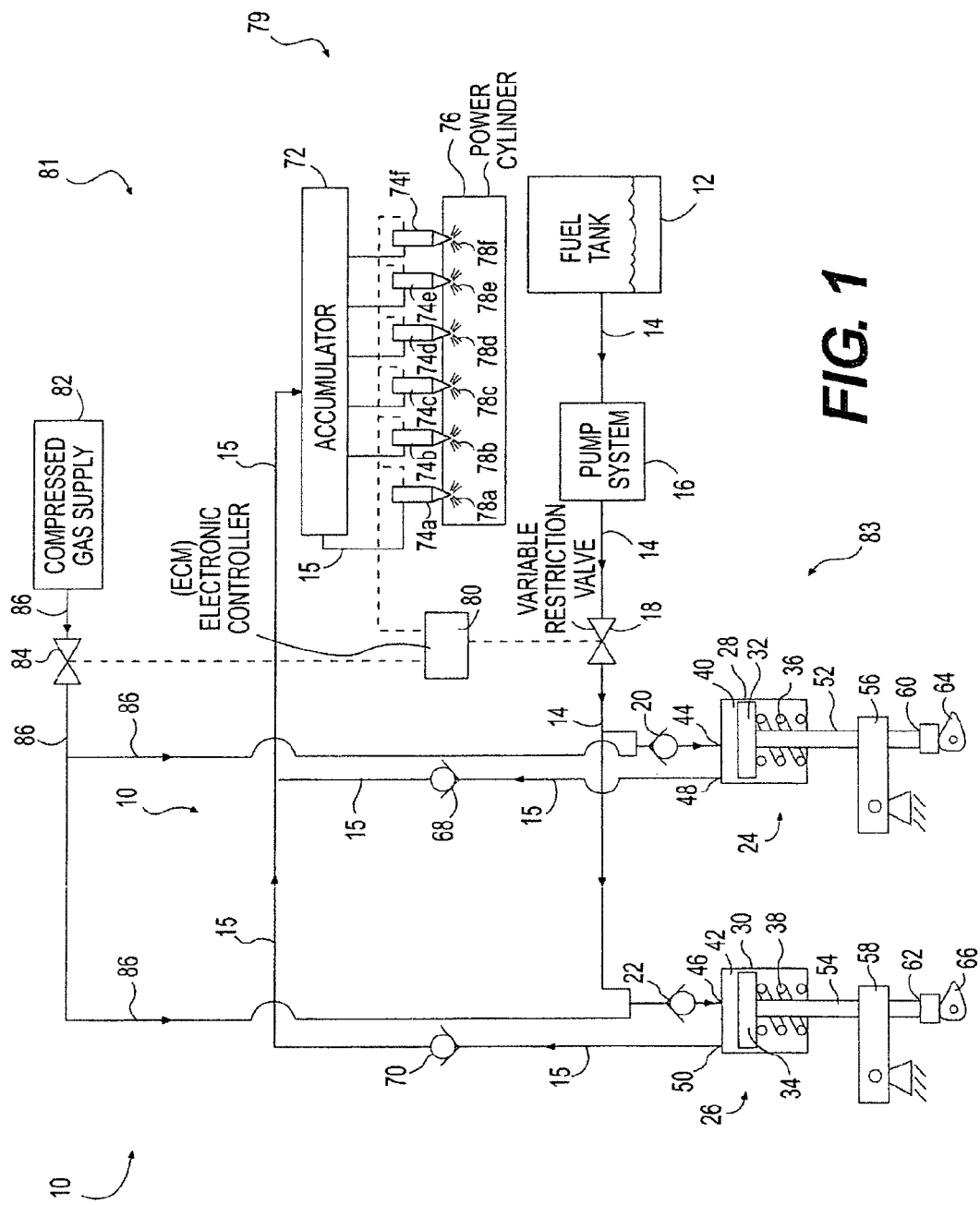
FIG. 1 is a schematic illustration of a common rail fuel system having a gas injection system according to an exemplary disclosed embodiment.

Referring to FIG. 1, the enhanced high pressure common rail fuel system 10 of the present invention supplies fuel to one or more power cylinders 76 of a power source. The power source may include an engine such as, for example, a diesel engine, a gasoline engine, a natural gas engine, or any other engine apparent to one skilled in the art. The power source may perform a combustion process which may be configured to utilize, for example, an air/fuel mixture. The power source may, alternatively, include another source of power such as a furnace or any other source of power known in the art.

The enhanced high pressure common rail fuel system 10 includes a common rail fuel system 79, a gas supply system 81, and a high pressure pump assembly 83. A fuel tank 12 is fluidly connected to the high pressure common rail fuel system 10 to provide a combustible substance via supply lines 14. The combustible substance may include, for example, gasoline, diesel fuel, reformate, and/or any other combustible substance known in the art. The supply lines 14 may include pipes, tubing, or any other fuel supply carrying means known in the art. The high pressure pump assembly 83 may include a pumping system 16 employed to deliver fuel from the fuel tank 12 throughout the high pressure common rail fuel system 10. The pumping system 16 may include one or more of a variety of pumps including, for example, a priming pump and a low pressure pump such as a rotary gear pump. The pumping system 16 may be fluidly coupled to the fuel tank 12 and one or more piston assemblies of the high pressure pump assembly 83.

The high pressure pump assembly 83 may also include a valve 18 positioned along supply line 14. As shown in FIG. 1, the pumping system 16 is fluidly connected to valve 18 via fuel supply line 14. Valve 18 may be a variable restriction valve suitable for allowing variable amounts of fuel to pass therethrough. In one disclosed embodiment, the variable restriction valve 18 may be controlled such as via an electronic controller 80 or similar device. The electronic controller 80 may include an electronic control module (ECM) suitable for regulating fuel flow by controlling an opening area of the variable restriction valve 18. Thus, based on measured conditions, for example, of the power source or high pressure common rail fuel system 10, the variable restriction valve 18 may be regulated to thereby increase or decrease the fuel flow in the high pressure common rail fuel system 10. The aforementioned conditions may include measurements related to engine speed, timing, engine temperature, exhaust flow temperature, exhaust flow pressure, and air/fuel mix parameters. Additional parameters not listed may also be employed as suitable criteria for determining the regulation of the variable restriction valve 18 accordingly.

The high pressure pump assembly 83 may also include one or more piston assemblies and a plurality of inlet and outlet check valves associated with respective piston assemblies (as further described below), whereby each aforementioned component is positioned downstream of the variable restriction valve 18 for receiving fuel from valve 18. By way of example, a first piston assembly 24 and a second piston assembly 26 are illustrated in FIG. 1. However, it should be understood, that any appropriate number of piston assemblies may be utilized by the disclosed invention. Inlet check valve 20 may be fluidly coupled between the variable restriction valve 18 and the first piston assembly 24. Likewise, inlet check valve 22 may be fluidly coupled between the variable restriction valve 18 and the second piston assembly 26.

The first piston assembly 24 includes a piston 32 slidable in a housing 28. The piston 32 may be coupled with a plunger 52 and a spring 36 arranged to urge the piston 32 in a first direction. The plunger 52 may be mechanically coupled to a rocker arm 56. The rocker arm 56 may be mechanically coupled to a rotatable cam 64, for example, a cam having a cam profile that determines fuel injection timing, and an associated cam follower 60 so as to transfer rotational motion of the cam 64 to linear motion of the piston 32 in the first direction. The piston 32 and the housing 28 define a first pressure chamber 40 in fluid communication with supply lines 14.

Similarly, the second piston assembly 26 includes a piston 34 slidable in a housing 30. The piston 34 may be coupled with a plunger 54 and a spring 38 arranged to urge the piston 34 in a first direction. The plunger 54 may be mechanically coupled to a rocker arm 58. The rocker arm 56 may be mechanically coupled to a rotatable cam 66, for example, a cam having a cam profile that determines fuel injection timing, and an associated cam follower 62 so as to transfer rotational motion of the cam 66 to linear motion of the piston 34 in the first direction. The piston 34 and the housing 30 define a second pressure chamber 42 in fluid communication with supply lines 14.

A gas supply 82 of the gas supply system 81 may be fluidly coupled, such as via supply lines 86, to the one or more piston assemblies including the high pressure pump assembly 83, for example, the first piston assembly 24 and the second piston assembly 26. The gas supply 82 may include a compressed gas supply such as air. The gas supply system 81 may also include valve 84 fluidly coupled between the gas supply 82 and the one or more piston assemblies including, for example, the first piston assembly 24 and the second piston assembly 26 of the high pressure pump assembly 83. The valve 84 may be a variable restriction type valve suitable for controlling, and varying, the amount of gas allowed to pass therethrough. In one disclosed embodiment, the variable restriction valve 84 may be controlled such as via the electronic controller 80 or similar device. The electronic controller 80 may include an ECM (as described above) and control the variable restriction valve 84 based on measured conditions, for example, of the power source or high pressure common rail fuel system 10, in order to increase or decrease gas flow in the high pressure common rail fuel system 10. Again, such conditions may include measurements related to engine speed, timing, engine temperature, exhaust flow temperature, exhaust flow pressure, and air/fuel mix parameters. Additional parameters not listed may also be employed as suitable criteria for determining the regulation of the variable restriction valve 84 accordingly. Thus, the present invention provides controlled amounts of gas introduced into the high pressure common rail fuel system 10 via the gas supply system 81.

In the exemplary embodiment shown in FIG. 1, the one or more piston assemblies including, for example, the first piston assembly 24 and the second piston assembly 26, are fluidly coupled to, and positioned downstream of, the variable restriction valve 84. Inlet check valve 20 is fluidly coupled between the variable restriction valve 84 and the first piston assembly 24. Likewise, inlet check valve 22 is fluidly coupled between the variable restriction valve 84 and the second piston assembly 26. Thus, both inlet check valves 20 and 22 are fluidly coupled to both variable restriction valves 18 and 84.

The first piston assembly 24 and the second piston assembly 26 are fluidly coupled to a common rail fuel apparatus such as an accumulator 72 via connection lines 15. Outlet check valve 68 is fluidly coupled between the first piston assembly 24 and the accumulator 72. Similarly, check valve 70 is fluidly coupled between the second piston assembly 26 and the accumulator 72.

A plurality of supply lines 17 are connected to one or more corresponding fuel injectors 74a-74f. By way of example, fuel injectors 74a-74f are illustrated in FIG. 1. It is understood that any suitable number fuel injectors may be utilized by the invention. Each of the fuel injectors 74a-74f may disperse a corresponding fuel spray plume 78a-78f into a corresponding power cylinder 76. The corresponding power cylinder 76 may be disposed within an engine including, for example, a diesel engine, a gasoline engine, a natural gas engine, or any other engine apparent to one skilled in the art. Timing and operation of the fuel injectors 74a-74f to generate and control respective fuel spray plumes 78a-78f may be controlled by the electronic controller 80 or ECM based upon measured conditions of the power source or high pressure common rail fuel system 10 as discussed above.

In operation, fuel is supplied from the fuel tank 12 and pumped towards the one or more piston assemblies via pumping system 16. The variable restriction valve 18 may be controlled (such as via the electronic controller 80) to allow a predetermined or prescribed amount of fuel to flow towards inlet check valves 20, 22. Once the pressure of the fuel overcomes the biased sealing force of inlet check valves 20, 22, the check valves open to allow fuel to flow into inlets 44, 46 of housings 28, 30, respectively. Additionally, embodiments of the present invention provide gas from gas supply 82 to inlet check valves 20, 22 via gas supply lines 86. The variable restriction valve 84 may be controlled (for example, by the electronic controller 80) to allow a prescribed amount of gas to flow towards check valves 20, 22.

Figure 2:
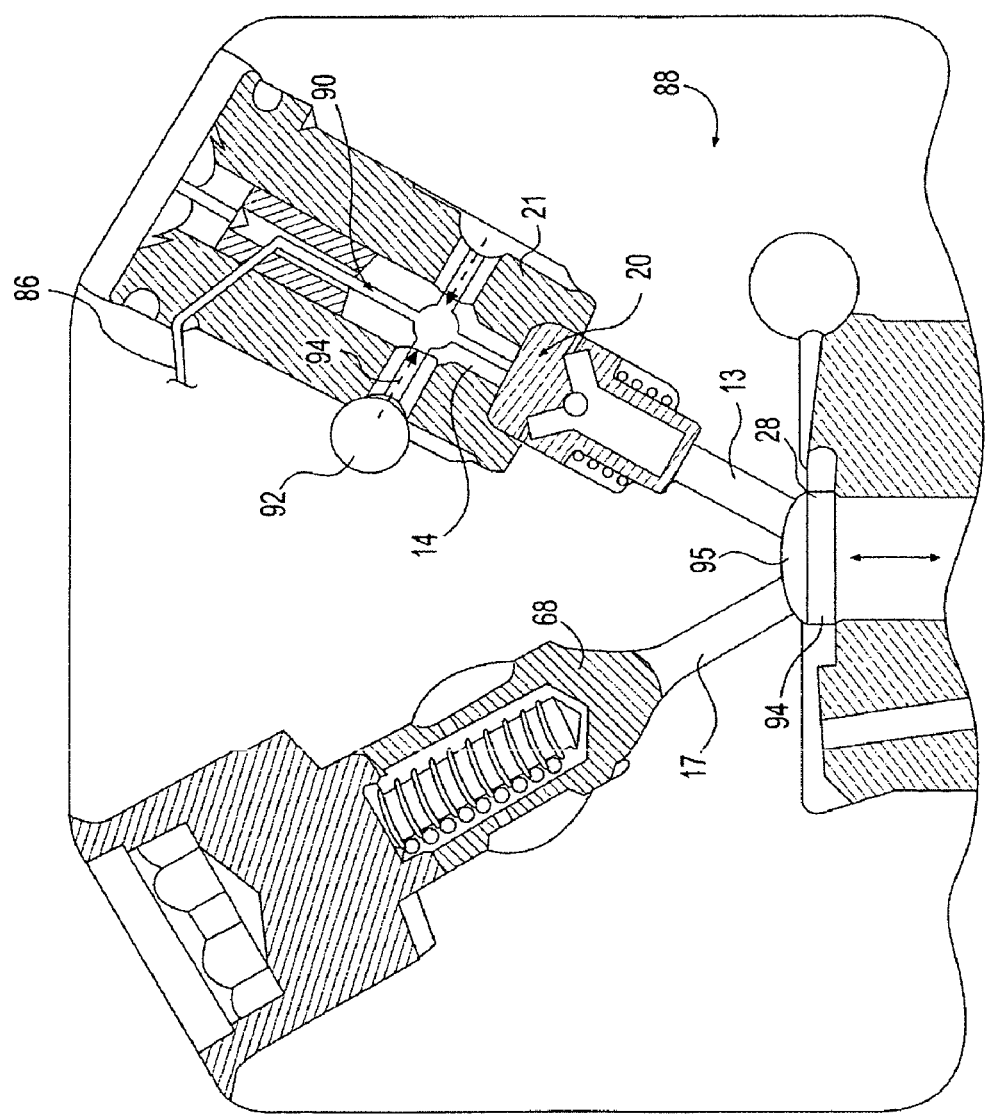
FIG. 2 provides an enlarged detail view of the high pressure pump assembly according to an exemplary disclosed embodiment.

Turning to FIG. 2, an embodiment of the high pressure pump assembly is shown. Inlet check valve 20 is positioned against check valve seat 21 when in a closed position and further fluidly coupled to housing 28 via passage 13. Fuel is received by a fuel intake means such as fuel supply passage 92, connected to a supply line 14, and directed to inlet check valve 20. Further, gas supply line 86 is configured to provide gas to gas supply needle 90 which directs gas flow to the inlet check valve 20. The inlet check valve 20 is biased into a closed position sealingly engaging seat 21 to prevent passage of fuel flow below a prescribed pressure. Once the pressure build up of the fuel and gas overcomes the sealing pressure of inlet check valve 20, the inlet check valve 20 opens and fuel is allowed to flow into orifice 13 into inlet 44 (FIG. 1) of pumping chamber 94. The fuel flow also draws gas bubbles from downstream of gas supply needle 90 and carries the gas bubbles into the pumping chamber 94 thereby creating a gas fuel mixture in pumping chamber 94. In one embodiment, the fuel may be supplied at a pressure within the range of approximately 6-300 psi. The gas supply 82 may provide gas (e.g., a non-condensable gas such as compressed air, hydrogen, propane or other suitable gas for reacting with the fuel) through the gas supply line 86 at a pressure within a range of approximately 0-300 psi. Thus, in one embodiment, the invention provides a gas fuel mixture of supplied gas at 1% volume of fuel at one atmosphere.

During the flow of gas fuel mixture into pumping chamber 94, piston 32 is displaced towards cam 64 (FIG. 1). When cam 64 operates to cause movement of the piston towards the pumping chamber in a pumping stroke, a pressure wave is created within the gas fuel mixture by movement of the piston. In addition, during the retraction stroke of the piston, a vacuum is created (such as at the top of plunger 52) thus generating cavitation bubbles. Hence, the cavitation bubbles may occur as a result of pressure differentials within the housing 28. When piston 32 compresses the gas fuel mixture in pumping chamber 94, the cavitation bubbles are collapsed. Ordinarily, collapse of the aforementioned cavitation bubbles has the potential to damage components of the high pressure common rail fuel system 10 (such as the within the high pressure pump head or dome 95 of the pumping chamber). However, in accordance with embodiments of the present invention, the gas (e.g., air) introduced into the fuel, from gas supply system 81, works as a shock absorber to decrease the magnitude of the negative pressure wave thereby reducing the effects of collapsed cavitation bubbles. This, in effect, will reduce or eliminate damage to system components and/or increase the service lifespan of the components.

Turning again to FIG. 2, outlet check valve 68 is shown in fluid connection with the pumping chamber 94 via orifice 17. As the piston 32 undergoes its retraction stroke, the gas fuel mixture is drawn into the pumping chamber such as through orifice 13. During the compression or pumping stroke, the piston 32 pressurizes the gas fuel mixture which forces the gas fuel mixture from the outlet 48 (FIG. 1) of housing 28 towards outlet check valve 68 such as via orifice 17. During pressurization of the gas fuel mixture, the gas will go into solution of the fuel as the pressure increases to create a high pressure gas fuel mixture. That is, the gas bubbles are reduced in size and are dispersed in the solution.

Outlet check valve 68 is biased into a sealed, closed position preventing flow of the gas fuel mixture below a prescribed pressure. Once the pressure of the gas fuel mixture overcomes the biased sealing force of outlet check valve 68, the outlet check valve 68 is opened and the highly pressurized gas fuel mixture may be delivered to additional equipment such as to common rail fuel system 79. As shown in FIG. 1, components of the common rail fuel system 79 may include an accumulator 72 and a plurality of fuel injectors 74*a*-74*f* configured to inject fuel into power cylinder 76. In one embodiment, the high pressure gas fuel mixture may be supplied to the accumulator 72, such as via conduit lines 15, at a pressure within the range of approximately 500-2600 bar.

Figure 3:
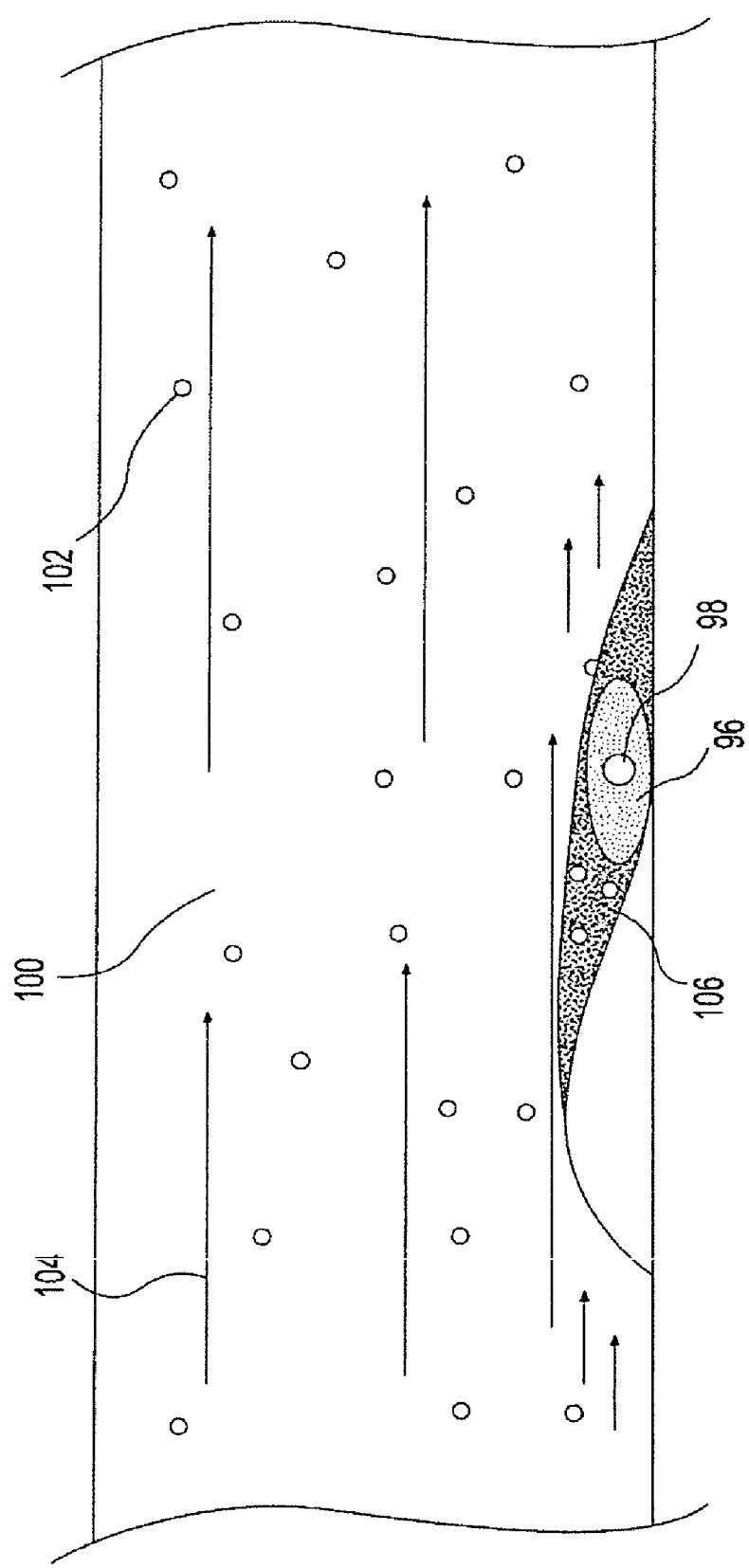
FIG. 3 illustrates a flow induced low pressure region of a working fluid according to an exemplary disclosed embodiment.

While cavitation may be produced as a result of pressure differentials in a volumetric region, flow induced cavitation is produced by fluid flow around pronounced corners. This is, at least in part, due to changes in fluid velocity and the generation of low pressure regions in the fluid which may occur as the gas fuel mixture is supplied to and throughout the common rail fuel system 79. Turning, for example, to FIG. 3, a working fluid 100 subjected to the gas injection process of the present invention is shown traveling in a fluid flow direction. The working fluid 100 includes a high pressure region 104. Within the high pressure region 104, highly pressurized gas bubbles 102 remain in solution.

As previously mentioned, a flow induced low pressure region 106 may be formed in working fluid 100. The flow induced low pressure region 106 is produced, for example, as a result of the working fluid 100 traversing or encountering a structure which reduces the velocity and/or pressure of the working fluid 100 in the vicinity of the structure. In accordance with the present invention, the low pressure region 106 also includes injected non-condensable gas (depicted as low pressurized gas bubble 98) provided in the gas fuel mixture by the disclosed gas supply system 81. When the gas fuel mixture encounters a flow induced low pressure region, the non-condensable gas i.e., low pressurized gas bubble 98, comes out of solution in an expanded state. The low pressurized gas bubble 98 will be encapsulated by any cavitation bubbles or fluid vapor cloud bubbles 96 within the flow induced low pressure region 106. Because the low pressurized gas bubble 98 expands more in the low pressure region 106, it occupies a larger portion of the fluid vapor cloud bubble 96. Thus, the internal volume of the fluid vapor cloud bubble 96 is reduced.

Should the fluid vapor cloud bubble 96 collapse to create a high temperature shock wave, the aforementioned shock wave could encounter and damage surfaces of components in proximity thereto. However, due to the low pressurized gas bubble 98 disposed within the working fluid 100 in accordance with the present invention, the effects of the collapsed cavitation bubble are reduced. As the cavitation bubble or fluid vapor could bubble 96 collapses (to otherwise create a high temperature shock wave), the gas bubble 98 acts as a "shock absorber" by preventing the maximum effect of the collapse of fluid vapor cloud bubble 96. Accordingly, the present invention provides the damping effect of gas bubble 98 to prevent and/or reduce the effects of damage, due to cavitation, upon surfaces of components of the disclosed high pressure common rail fuel system 10. The aforementioned components may include, for example, seals, supply lines, injector valves, housings, and check valves.

Turning again to FIG. 3, upon exiting the accumulator 72, the highly pressurized fuel gas mixture may be supplied to respective fuel injectors 74*a*-74*f* via feed lines 17. Electronic controller 80 may actuate the fuel injectors 74*a*-74*f* to inject and disperse respective spray plumes 78*a*-78*f* containing the fuel gas mixture. Prior to dispersion, the injected gas remains in solution of the high pressure gas fuel mixture. However, the pressure of the high pressure gas fuel mixture is reduced during dispersion. In one example, the dispersion of the spray plume within a respective power cylinder reduces the pressure of the gas fuel spray mixture from approximately 500-2600 bar down to approximately 200 bar. As the pressure of the gas fuel mixture is reduced during dispersion/injection into the power cylinder 76, the injected gas bubbles expand and come out of solution of the working fluid or fuel. During the rapid reduction of pressure, the gas bubbles increase in volumetric size. Such expansion facilitates dispersion of spray plumes 78a-78f of respective fuel injectors 74a-74f as the gas fuel mixture is vaporized. This expansion may more fully atomize the spray plumes 78a-78f to create a better fuel spray for ignition. An improved fuel spray is produced in that the fuel spray covers more surface area and is more conducive to ignition thereby increasing fuel efficiency. The dispersion of the improved spray plumes 78a-78f by the expansion of the injected gas bubbles may also allow the spray plumes 78a-78f to burn more quickly and cleanly. This can also increase the efficiency of the engine and improve emissions.

The high pressure common rail fuel system 10 including the injected gas supply system 81 of the present disclosure may be used with any type of internal combustion engine. According to the present invention, a high pressure pump assembly 83 is coupled in fluid connection between fuel tank 12 supply and a gas supply system 81. A common rail fuel system is also fluidly connected downstream of the high pressure pump assembly 83. By way of example, the gas injected supply system 81 may be used in tandem with the high pressure common rail fuel system 10 of an internal combustion engine, such as a diesel engine, to provide high pressure gas fuel mixture to the common rail fuel system 79. In such an engine, the gas injection supply system 81 is used to facilitate injection of gas into a working fluid or fuel of the high pressure common rail fuel system 10 in order to reduce or eliminate the effects of microscopic fluid vapor cloud bubbles or cavitation bubbles dispersed within the working fluid, i.e., fuel. The disclosed high pressure common rail fuel system 10 and injected gas supply system 81 may also be useful in reducing the effects of cavitation such as within and on system components. These components may include seals, fluid lines, and valves disposed within the high pressure common rail fuel system 10.

It will be apparent to those skilled in the art that various modifications and variations can be made in the disclosed apparatus and method without departing from the scope of the disclosure. Additionally, other embodiments of the apparatus and method will be apparent to those skilled in the art from consideration of the specification. It is intended that the specification and examples be considered as exemplary only, with a true scope of the disclosure being indicated by the following claims and their equivalents.

What is claimed is:

1. A high pressure common rail fuel system, comprising:
    a fuel supply;
    a high pressure fuel pump assembly fluidly connected to receive fuel from the fuel supply;
    a gas supply system including at least one gas supply line directly connected to the high pressure fuel pump assembly to provide gas to the high pressure fuel pump assembly to create a high pressure gas fuel mixture; and
    a common rail fuel system fluidly connected to the high pressure fuel pump assembly to receive the high pressure gas fuel mixture.

2. The system of claim 1, wherein the high pressure pump assembly includes:
    a variable restriction valve in fluid connection with the fuel supply;
    at least one piston assembly;
    at least one inlet check valve fluidly coupled to the at least one piston assembly and the variable restriction valve;
    at least one outlet check valve fluidly coupled to the at least one piston assembly and the common rail fuel system, whereby the variable restriction valve controls a flow of fuel to the at least one inlet check valve.

3. The system of claim 2, wherein the gas supply system includes:
    a gas supply;
    another variable restriction valve fluidly coupled to the gas supply and the at least one inlet check valve, whereby said another variable restriction valve controls flow of gas to the at least one inlet check valve.

4. The system of claim 3, wherein the variable restriction valves of the high pressure pump assembly and the gas supply system are configured to regulate fuel and gas flow, respectively, via an electronic controller based upon one or more prescribed conditions.

5. The system of claim 4, wherein the one or more prescribed conditions includes engine speed, timing, engine temperature, exhaust flow temperature, exhaust flow pressure, and air/fuel mix parameters.

6. The system of claim 3, wherein the gas supply includes a compressed air supply.

7. The system of claim 3, wherein the gas supply system is configured to provide gas to the at least one inlet check valve at a pressure within a range of approximately 6-300 psi.

8. The system of claim 3, wherein the at least one inlet check valve is configured to provide a gas fuel mixture to the at least one piston assembly.

9. The system of claim 3, wherein the at least one piston assembly is configured to pressurize the gas fuel mixture.

10. The system of claim 9, wherein the gas fuel mixture is pressurized within a range of approximately 500-2600 bar.

11. The system of claim 1, wherein the common rail fuel system includes:
    an accumulator;
    a power cylinder;
    at least one fuel injector in fluid connection with the accumulator, and in further contact with the power cylinder.

12. The system of claim 11, wherein the at least one fuel injector is configured to disperse the high pressure gas fuel mixture into the power cylinder.

13. The system of claim 12, wherein the high pressure gas fuel mixture is dispersed at a pressure of approximately 200 bar.

14. A method of reducing cavitation in a high pressure common rail fuel system, comprising:
    providing a fuel supply to a high pressure fuel pump assembly;
    delivering a gas supply to the high pressure fuel pump assembly;
    mixing fuel and gas to form a gas fuel mixture;
    pressurizing said mixture at a first pressure;
    supplying the pressurized gas fuel mixture to a common rain fuel system; and
    atomizing the gas fuel mixture.

15. The method of claim 14, further comprising:
    providing the fuel supply to the high pressure pump assembly at a pressure within a range of approximately 6-300 psi.

16. The method of claim 14, further comprising:
    delivering the gas supply to the high pressure pump assembly at a pressure within a range of approximately 6-300 psi.

17. The method of claim 14, further comprising:
mixing the fuel and gas to generate a gas fuel mixture of approximately gas at 1% volume of fuel at one atmosphere.

18. The method of claim 14, wherein the pressurizing step includes pressurizing the mixture at a pressure within a range of approximately 500-2600 bar.

19. The method of claim 14, further comprising:
atomizing the gas fuel mixture at approximately 200 bar.

20. The method of claim 14, further comprising:
automatically regulating the supply of fuel and gas to the high pressure fuel pump assembly.

21. The method of claim 20, further including automatically regulating the supply of fuel and gas based upon one or more prescribed conditions of the fuel system or an engine.

22. A system of claim 21, wherein the one or more prescribed conditions includes engine speed, timing, engine temperature, exhaust flow temperature, exhaust flow pressure, and air/fuel mix parameters.

23. A system for reducing cavitation in a high pressure common rail fuel system, comprising:
means for providing a fuel supply to a high pressure fuel pump assembly;
means for delivering a gas supply to the high pressure fuel pump assembly;
means for mixing fuel and gas to form a gas fuel mixture;
means for pressurizing the gas fuel mixture at a first pressure;
means for supplying the pressurized gas fuel mixture to a common rail fuel system; and
means for atomizing the pressurized gas fuel mixture.

* * * * *